(12) United States Patent
John et al.

(10) Patent No.: US 8,966,513 B2
(45) Date of Patent: Feb. 24, 2015

(54) SYSTEM AND METHOD FOR PROCESSING MEDIA HIGHLIGHTS

(75) Inventors: Ajita John, Holmdel, NJ (US); Michael J. Sammon, Watchung, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 140 days.

(21) Appl. No.: 13/172,475

(22) Filed: Jun. 29, 2011

(65) Prior Publication Data

US 2013/0007787 A1    Jan. 3, 2013

(51) Int. Cl.
| | |
|---|---|
| H04N 7/16 | (2011.01) |
| H04N 21/422 | (2011.01) |
| H04N 21/4223 | (2011.01) |
| H04N 21/43 | (2011.01) |
| H04N 21/462 | (2011.01) |
| H04N 21/466 | (2011.01) |
| H04N 21/4788 | (2011.01) |
| H04N 21/658 | (2011.01) |
| H04H 60/33 | (2008.01) |
| H04H 60/73 | (2008.01) |

(52) U.S. Cl.
CPC ..... *H04N 21/42203* (2013.01); *H04N 21/4223* (2013.01); *H04N 21/4307* (2013.01); *H04N 21/4622* (2013.01); *H04N 21/4661* (2013.01); *H04N 21/4788* (2013.01); *H04N 21/6582* (2013.01); *H04H 60/33* (2013.01); *H04H 60/73* (2013.01)

USPC .............................................. 725/10; 709/231

(58) Field of Classification Search
CPC .................................................. H04N 21/235
USPC ............. 725/86–118, 131–134, 139–142, 10; 709/217–232
See application file for complete search history.

(56) References Cited

U.S. PATENT DOCUMENTS

| | | | | |
|---|---|---|---|---|
| 6,177,931 | B1 * | 1/2001 | Alexander et al. .............. | 725/52 |
| 6,477,705 | B1 * | 11/2002 | Yuen et al. ....................... | 725/41 |
| 6,711,741 | B2 * | 3/2004 | Yeo .................................. | 725/87 |
| 7,127,735 | B1 * | 10/2006 | Lee et al. ......................... | 725/87 |
| 2002/0194620 | A1 * | 12/2002 | Zdepski ......................... | 725/138 |
| 2006/0149781 | A1 | 7/2006 | Blankinship | |
| 2009/0171985 | A1 | 7/2009 | Tischer | |

* cited by examiner

Primary Examiner — Annan Shang

(57) ABSTRACT

Disclosed herein are systems, methods, and non-transitory computer-readable storage media for processing media highlights. A first method includes displaying a real-time media event to a user, and, upon receiving a first indication from the user at a first time, generating a highlight of the real-time media event based on the first time, the highlight being associated with a portion of the real-time media event at the first time, and associating, in a highlight database, the highlight with an individual profile of the user. The highlight can include parameters for media content and/or duration. The highlight duration can be based on an analysis of content of the real-time media event. Highlights can be assigned to specific highlight categories. Other aspects disclosed herein apply to playback of media highlights during playback of a recorded media event, and managing stored highlights.

20 Claims, 6 Drawing Sheets

SYSTEM AND METHOD FOR PROCESSING MEDIA HIGHLIGHTS

BACKGROUND

1. Technical Field

The present disclosure relates to media consumption and playback and more specifically to handling media highlights associated with media consumption and/or playback.

2. Introduction

Media consumption has traditionally been a very passive activity, where viewers or listeners do not participate with the media. Some examples of media consumption are broadcast television, on-demand movies, radio broadcasts, web casting, and live events. With the rise of the Internet, smartphones, social networks, and other technology, media consumers are beginning to expect a richer, more interactive experience from almost every form of media. However, this rich experience is unavailable in many traditional forms of media consumption. Users are unable to interact with the media, personalize the media, or easily and directly interact with other users participating in a particular media event.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for allowing users to highlight events explicitly in real time. An event can be a television broadcast, attending a live performance, listening to the radio, etc. In a simple implementation, a user presses a highlight button on a remote control of a television and/or digital video recorder (DVR) to designate a highlight, while the program continues being displayed. More complicated interfaces allow users to trigger, create, or instantiate highlights with gestures, such as gestures captured from a Microsoft® Xbox® Kinect®. The user can raise a hand to signify a highlight and lower the hand the signify the end of a highlight. The system can alternatively operate via voice commands either through natural language and/or through a specific vocabulary of command words, such as "start highlight" and "stop highlight". The system can apply a highlight to a specific segment or an object in the media event, such as a scene or segment of a movie, a particular actor, or an object. A highlight referring to a segment can have a start point and a stop point. A highlight applying to a specific object in the media event can have multiple start points and stop points.

Often a user does not clearly realize that a segment is worth highlighting until after it starts, is over, or is almost over. In these cases, the user can mark the desired segment, such as via natural language, during or shortly after the segment. For example, the user can say "highlight that last Steven Colbert interview" or "highlight that report on the deficit".

The system can incorporate visual and/or audible effects to indicate that the media event is highlighted. Examples of visual and audible effects include an added audio tone, a changed appearance of the video or quality of the audio, added visual objects, embedded animations into the video, and modifications of any other aspect of visible, audible, or other data associated with playback of the media. The visual and/or audible effects can include inset video, picture-in-picture, and overlay graphics or audio. Highlighted portions can also convey author, community, type, and the purpose of the highlighting. For example, a highlighted portion can include text indicating "this is an important passage" or "I wanted you to see this", etc.

The system can automatically generate cue points based on the highlighted segments to generate a summary of portions of interest. Similarly, the system can automatically focus on and display a particular subset of the highlights for a particular user based on similarities of that particular user to the users who generated the highlights. For example, the system can select highlights for playback that come from users with similar social networking profiles or having similar demographic characteristics.

This disclosure is directed to at least three different aspects of media highlights. A first aspect is generating media highlights. In this aspect, the system displays a real-time media event to a user and, upon receiving a first indication from the user at a first time, generates a highlight of the real-time media event based on the first time. The highlight can be associated with a portion of the real-time media event at the first time. Then the system associates, in a highlight database, the highlight with an individual profile of the user.

A second aspect is playing back media highlights. In this aspect, the system retrieves a recorded media event and retrieves a highlight database storing a highlight associated with the recorded media event and generated based on input received from a prior user viewing a prior real-time playback of the recorded media event. The highlights can include metadata and a temporal position relative to the recorded media event, and can be associated with a portion of the recorded media event. Then the system starts playback of the recorded media event, and, during the playback of the recorded media event and at the temporal position relative to the recorded media event, the system modifies the portion according to the metadata.

A third aspect is modifying stored highlights, which can occur during playback of a media event or independent of playback of the media event. In this aspect, the system displays to a user a list of highlights from a highlight database storing highlights associated with a recorded media event and generated based on input received from a prior user viewing a prior real-time playback of the recorded media event. Each highlight can include metadata and a temporal position relative to the recorded media event. The system receives from the user a selection of a highlight from the list of highlights and receives from the user an instruction to modify the highlight. Then the system modifies the highlight according to the instruction.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
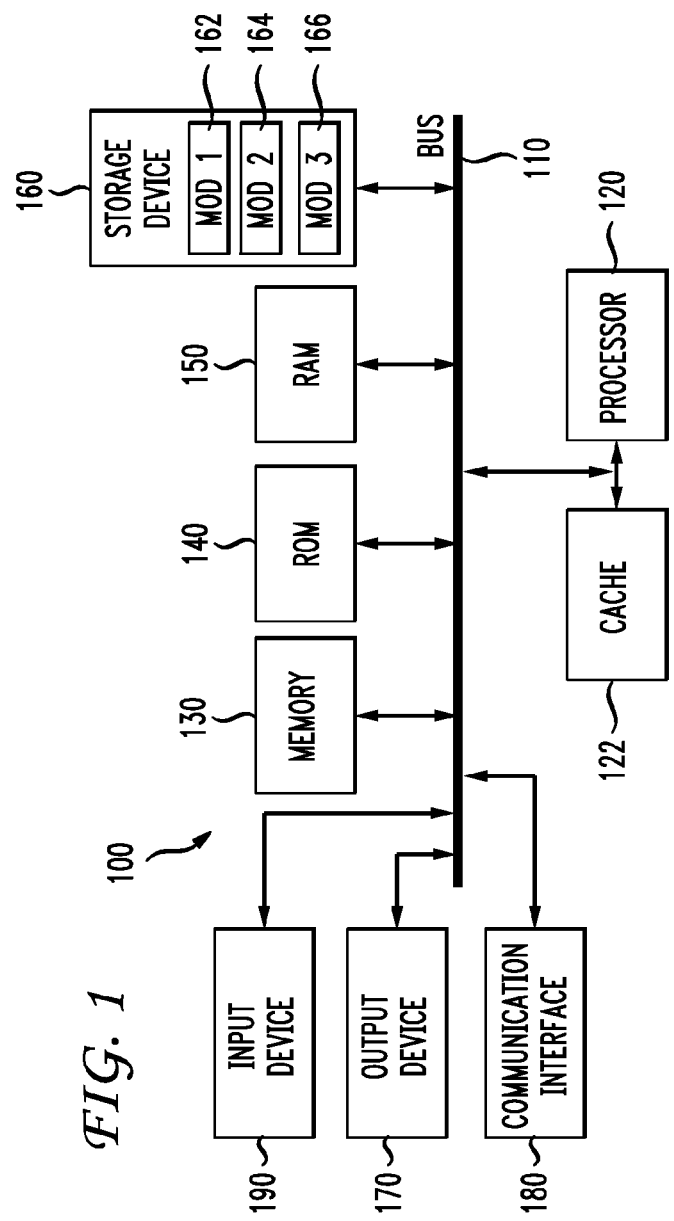
FIG. 1 illustrates an example system embodiment.

A brief introductory description of a basic general purpose system or computing device in FIG. 1 which can be employed to practice the concepts is disclosed herein. A more detailed description of generating, displaying, and otherwise managing media highlights will then follow. These variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
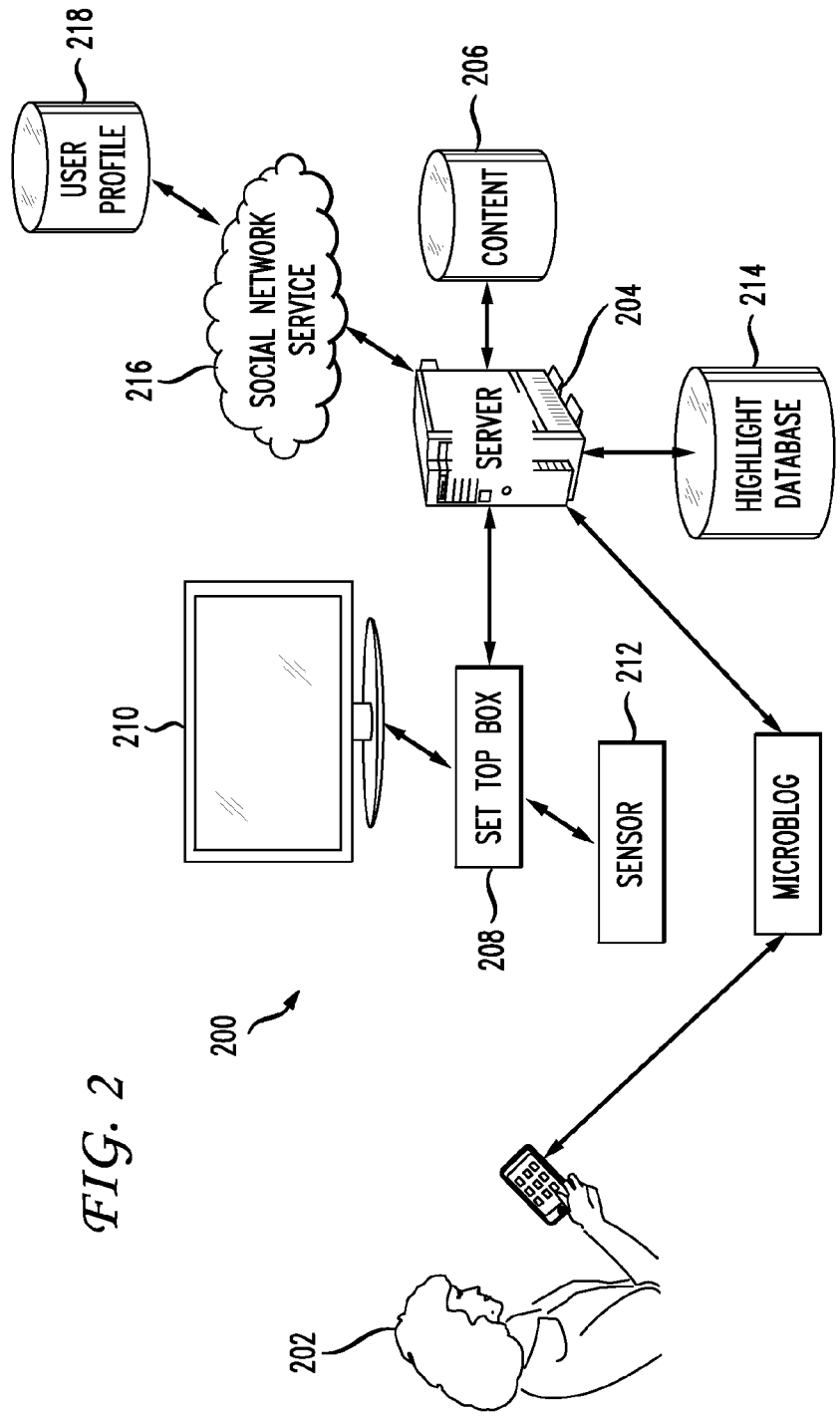
FIG. 2 illustrates an exemplary system architecture for creating, viewing, and editing highlights.

Having disclosed some components of a computing system, the disclosure now returns to a discussion of media highlights. FIG. 2, which illustrates an exemplary system architecture 200 for creating, viewing, editing, and otherwise managing highlights. In this architecture 200, a user 202 is viewing a media event, such as a video broadcast on a television 210, a replay of a recorded television show, or a radio broadcast. The media event can be live or pre-recorded, but the user 202 is consuming the media event in real time. The media event can be live, such as a user watching a sporting event in a stadium. As the user 202 watches or consumes the media, the user can interact with a server 204 such as via a computing device or other input mechanism such as a mechanical button. The computing device can be a remote control, a mobile computing device such as a tablet or smartphone, or a desktop computer. In the case of a remote control, for example, the user 202 transmits a signal to a sensor 212 connected to a set top box 208 that communicates with the server 204. The path signals travel to the server 204 can vary based on the type of input received from the user. For instance, the user 202 can send a signal to the server 204 by posting a message to a microblog via a smartphone. The server 204 has access to a content database 206 that can store either a searchable list of ongoing media events and/or the actual media being played back to the user 202. The user 202 sends to the server 204 signals associated with a highlight. The user 202 continues viewing the media event. The server 204 interprets or parses those signals to generate highlights and stores those highlights in a highlight database 214. The server 204 can associate highlights with a particular piece of media and can incorporate metadata into the highlights, such as the creator, the creation date, comments, permissions to change or revise the highlight, and permissions to share the highlight. Further, the server 204 can retrieve, via a social network service 216, a user profile 218 associated with the user 202. In this way, the server 204 can classify or group the highlight with other highlights from similar users.

When playing back highlights to a user 202, the server 204 can identify the user 202, fetch the media from the content database 206, and relevant highlights from the highlight database 214. The server can then stream the media information to the set top box 208. The server 204 can transmit the highlights to the set top box in advance of the media playback or can stream the highlights to the set top box just-in-time'. The set-top box can interpret the highlights and modify the video based on the highlights. In yet another variation, the server 204 preprocesses the media content based on the highlights before transmission and sends the preprocessed stream to the set top box for playback to the user. The server 204 can provide interfaces for the user 204 to modify, delete, share, and view metrics and analytics of highlights. These interfaces can be a web-based interface, a smartphone application, a set top box application, text messaging, and so forth.

Figure 3:
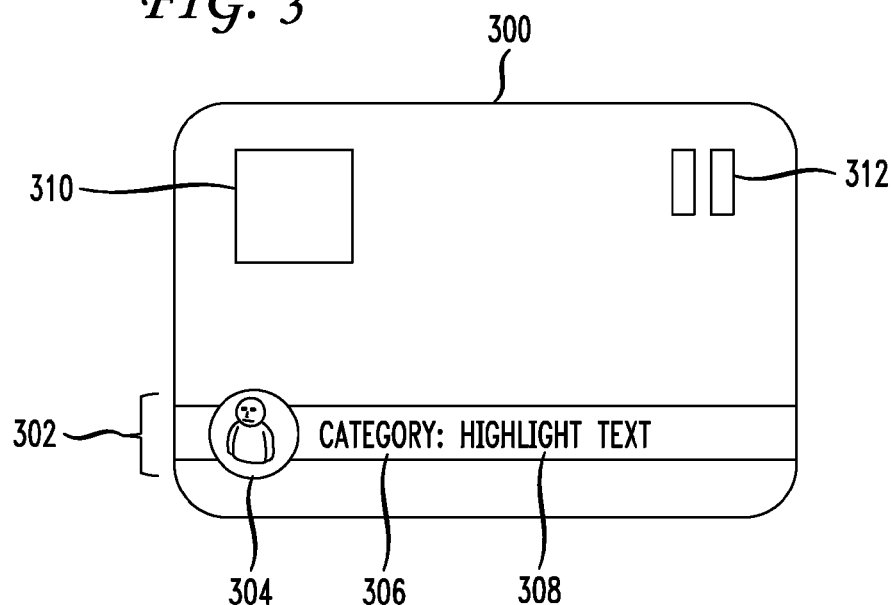
FIG. 3 illustrates an exemplary display including modifications based on highlights.

FIG. 3 illustrates an exemplary display 300 including modifications based on highlights. The system can display highlights in a number of ways. For example, the display 300 can include a bar 302 laid over the video of scrolling text for textual highlights. The bar 302 can incorporate a profile picture 304 of the person who generated the currently shown highlight. The system can pull these profile pictures directly from a social network or other source, such as via an API. The bar 302 can include a category 306 of a highlight and any text 308 describing the highlight. The user can customize what portions are displayed in the bar, how frequently they are updated, and any thresholds associated with selecting which highlights are shown. The display 300 can include overlaid images or video 310 in a picture-in-picture form. The system can pause or otherwise manipulate the media itself or playback of the media based on the highlights. For example, if one of the highlights is associated with a poll, the system can pause the media and show an indicator 312 that the media is paused, pending user input to the poll. After the user interacts with the highlight, the system can automatically resume playback of the media. These and other types of modifications to the media are possible. In non-visual media, such as an audio broadcast, the system can modify the main audio signal by making the media temporarily quieter, and playing a highlight audio signal over the main audio signal. Then, after the highlight audio is over, the system can return the media to a normal volume. The system can also display highlights on a side channel without directly modifying the media. For example, the system can cause a smartphone or tablet computing device to display highlights while the user watches the media event on a laptop or on a television.

Figure 4:
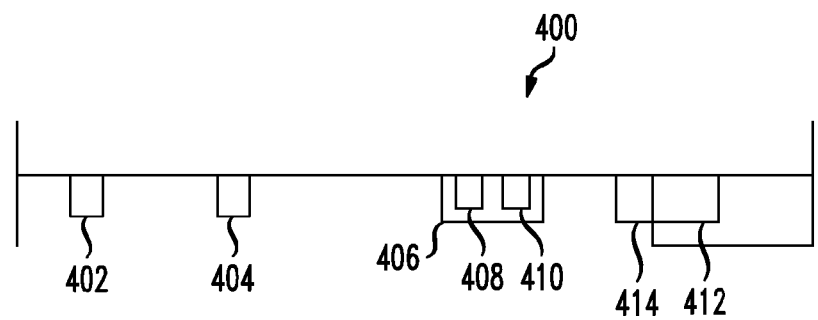
FIG. 4 illustrates an example timeline showing temporal locations of highlights relative to the media.

FIG. 4 illustrates an example timeline 400 showing temporal locations of highlights relative to the media. Highlights from a single user or multiple users can overlap each other in time for a same media event. In this example, a first highlight 402 is separate from a second highlight 404. A third highlight 406 contains or overlaps with two smaller highlights 408, 410. A fourth highlight 414 and fifth highlight 412 overlap each other. The system can examine the priority of overlapping highlights to determine which ones to display. For example, the system can determine a threshold similarity of a viewing user's social network profile to profiles of creators of two overlapping highlights. The system can select the highlight for display that is associated with a creator having a closest similarity to a viewing user. Alternatively, the system can display multiple highlights simultaneously.

The system can assign different permissions to different users or viewers of the media event. Example permissions include editor, owner, viewer, non-editor, and so forth. The system can track and report statistics associated with highlights. The system can track how many times the highlight has been displayed to a user, how many users have interacted with the highlight, how many similar highlights have been entered by other users, popularity of the highlight over time, and so forth. The system can then display this analytics information to the creator of the highlight and/or other users. Users can share portions of the media event based on the highlights. For example, the user can highlight a section of a television show and afterward click to share the highlight in a social network or via email.

Figure 5:
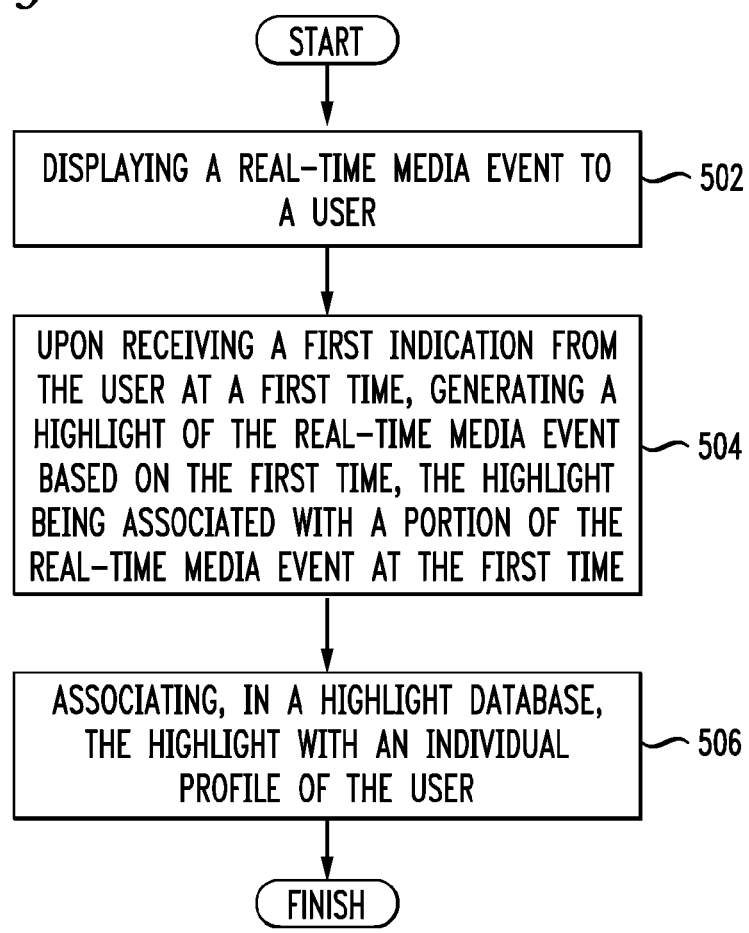
FIG. 5 illustrates a first example method embodiment for generating highlights.
Figure 6:
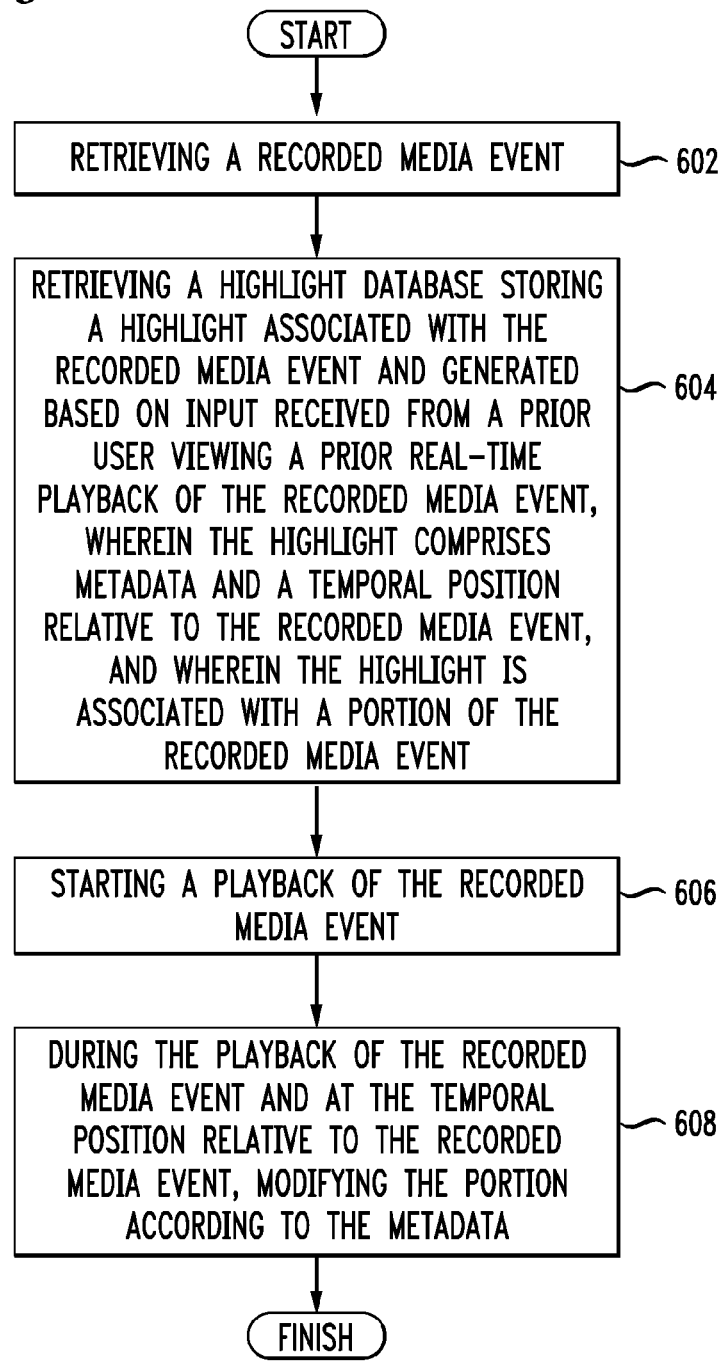
FIG. 6 illustrates a second example method embodiment for playing media content and modifying the media content based on highlights.
Figure 7:
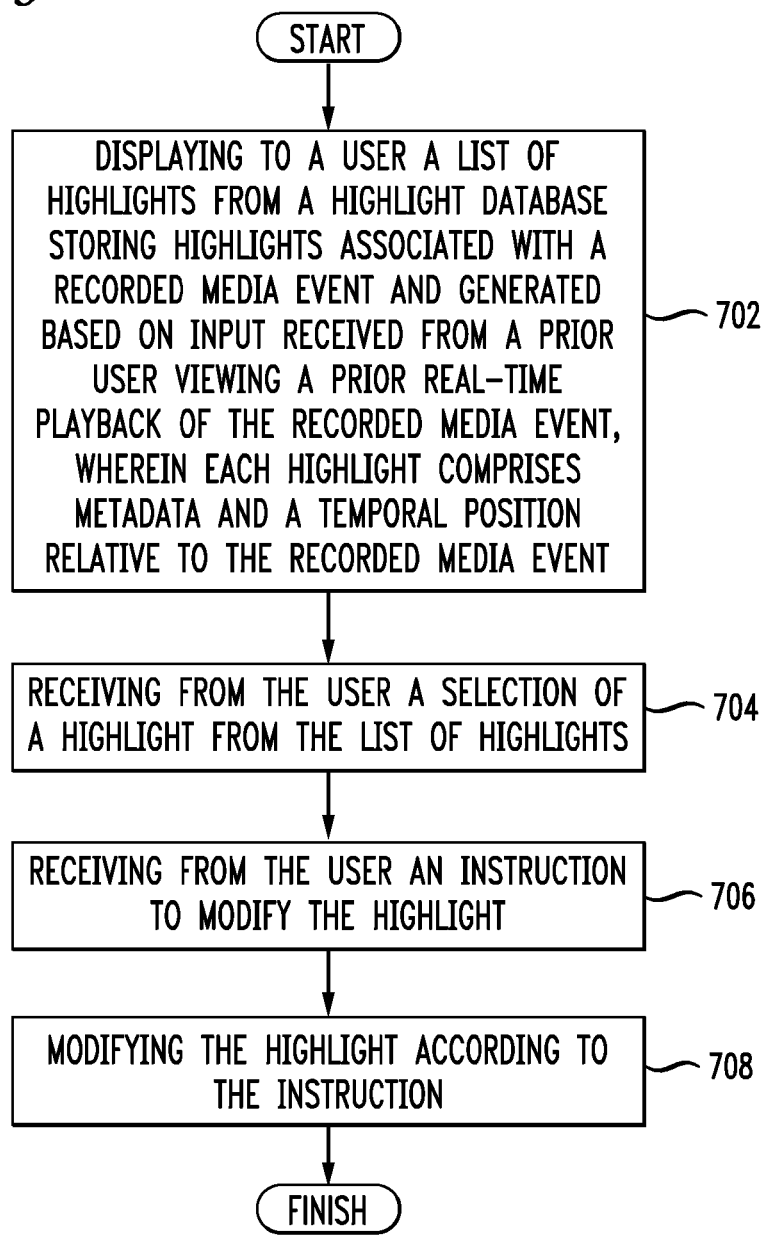
FIG. 7 illustrates a third example method embodiment for editing highlights.

Having disclosed some basic system components and concepts, the disclosure now turns to the exemplary method embodiment shown in FIGS. 5-7. For the sake of clarity, each of the methods is discussed in terms of an exemplary system 100 as shown in FIG. 1 configured to practice the respective method. The steps outlined herein are exemplary and can be implemented in any combination thereof, including combinations that exclude, add, or modify certain steps.

FIG. 5 illustrates a first example method embodiment for generating highlights. The system 100 displays a real-time media event to a user (502). The real-time media event can be a live broadcast, a live replay of a previously recorded event, a substantially real-time (i.e. slightly time-delayed) media event, and so forth. Upon receiving a first indication from the user at a first time, the system 100 generates a highlight of the real-time media event based on the first time, the highlight being associated with a portion of the real-time media event at the first time (504). The system can receive the first indication via a remote control, a gesture received via a camera and processed by a gesture recognizer, and/or a speech command received via a microphone and processed by a speech recognizer. A user can interact with a highlight button or highlight device that is separate from displaying the real-time media event to the user. For example, a television and set-top box can present the media event to the user, and the user can highlight the media event via a separate network-enabled device that is coupled to or associated with the event, but not necessarily with the media output device(s). For example, a highlight remote control can submit highlight information to a highlight server that correlates received information with a particular media event, such as based on timestamps.

The highlight can include one or more parameters associated with the media content and/or duration of the highlight. The system can generate the highlight based on the indication and an analysis of content of the real-time media event to identify a duration of the highlight. The system can generate the highlight based on the indication and an analysis of content of the real-time media event to identify at least one of an object, a topic, and a person in the real-time media event with which to associate the highlight. Highlights can include a predetermined duration. In one variation, the first indication indicates a highlight category, in which case the system can associate the highlight with the highlight category in the highlight database. The highlight can be associated with a specific temporal region of the real-time media event based on the first time.

The system 100 associates, in a highlight database, the highlight with an individual profile of the user (506). The system can optionally receive a second indication from the user at a second time that is later than the first time, and set a duration for the highlight based on the second time. For example, a user may be watching a live broadcast of an awards ceremony on television, and may want to highlight a particular award presentation segment so that she can watch it again later or send the clip to her friend on social media. As the segment begins to air on television, she can click the highlight button on her remote control or otherwise send a signal to the system (e.g., via voice command or gesture) to indicate the start point of the highlight. The live broadcast continues to air. After about five minutes, she can make another indication to the system by remote control, etc., to mark the end point of the highlight. She continues to watch the rest of the awards ceremony.

FIG. 6 illustrates a second example method embodiment for playing media content and modifying the media content based on highlights. The system 100 retrieves a recorded media event (602). The system 100 retrieves a highlight database storing a highlight associated with the recorded media event and generated based on input received from a prior user viewing a prior real-time playback of the recorded media event, wherein the highlight includes metadata and a temporal position relative to the recorded media event, and wherein the highlight is associated with a portion of the recorded media event (604). The highlight database can reside in a separate location from the recorded media event, a network server, a local database, and/or in a same file as the recorded media event.

The system 100 starts a playback of the recorded media event (606). The system can start playback based on a request from a viewer by selecting the highlight from the highlight database based on a social network profile of the viewer. The system can select the highlight based on a threshold similarity level between the viewer and the prior user. During the playback of the recorded media event and at the temporal position relative to the recorded media event, the system 100 modifies the portion according to the metadata (608). The system can modify the portion by inserting an audio effect, inserting a video effect, modifying an audio portion of the recorded media event, modifying a video portion of the recorded media event, inserting a text element, pausing the recorded media event, presenting a poll, inserting a separate media object as a picture-in-picture, inserting a hyperlink, and/or inserting a document. The system can modify the portion in other ways as well, depending on the highlight, the type of highlight, a number of simultaneously occurring highlights, the content of any other temporally simultaneous or contiguous highlights, and/or the content of the media event at that portion. In one aspect, the highlight is a color overlaid on top of the video content. In this way, a user can add a yellow highlight to the media in a similar fashion to marking a passage of a book with a yellow marker highlighter. The user can select or modify a particular overlay color via the original highlight input or can change the highlight color after the highlight has been created. The system can alternatively automatically select the color based on a relationship of the highlight creator to the viewer of the highlight, content of the media presentation, and/or other factor. The overlaid color can cover the entire display or can cover only a portion of the display. The portion covered by the overlaid color can indicate, track, and/or follow a highlighted item, object, or theme. The system can display the highlights differently for different users based on each user's relationship or similarity to the creator of the highlight, for example.

FIG. 7 illustrates a third example method embodiment for editing highlights. The system 100 displays to a user a list of highlights from a highlight database storing highlights associated with a recorded media event and generated based on input received from a prior user viewing a prior real-time playback of the recorded media event, wherein each highlight includes metadata and a temporal position relative to the recorded media event (702). The system 100 receives from the user a selection of a highlight from the list of highlights (704).

The system 100 receives from the user an instruction to modify the highlight (706). The system can receive the instruction via a remote control, a gesture received via a camera and processed by a gesture recognizer, and/or a speech command received via a microphone and processed by a speech recognizer.

The user can edit highlights via a graphical user interface on a suitable device, but can edit the highlights in other ways as well, such as via text message. The user can edit, delete, manage, or otherwise manipulate highlights via virtually any type of device, such as a mobile phone or a set top box. In one aspect, the highlights are stored locally to a playback device and are locally retrieved for display to the user in conjunction with a media event. In another aspect, the highlights are stored in a network accessible storage and the playback device and/or other associate device fetches the highlights for display to the user with the media event.

The system 100 modifies the highlight according to the instruction (708). The system can modify the highlight by modifying the metadata associated with the highlight, by assigning or reassigning the highlight to a category, and/or by assigning the highlight to a different recorded media event. The system can perform an analysis of the recorded media event based on the instruction and modify the highlight according to the analysis.

The system can perform additional analysis of the highlights and associated media content to determine which highlighted events can be grouped together. For example, in a one user scenario, a user can highlight favorite jokes from a comedy show. The system can analyze the highlights and group the highlights into categories, such as relationships, life in Los Angeles, word plays, and so forth. Then, the system is able to play back highlights from a specific category. In a multi-user scenario, the system can analyze highlights from multiple users, and merge, join, or combine highlights that have a sufficient similarity to each other. For example, if 5,000 viewers of a football game all highlight an 80 yard run for a touchdown, the system can determine the similarity between all those highlights and group the highlights together for presentation as a single highlight, optionally preserving all or part of the metadata and other features of the separate individual highlights. The system can classify similar highlights in a shared category, or can assign similar highlights a common tag or piece of metadata.

Using a similar analysis, the system can detect a pattern of highlights from a specific user, and recommend or suggest other regions for highlighting that follow or are close to the pattern. The system can determine patterns of highlights for a single user or for an aggregated group of users. Users can review highlights after they are recorded, and tag, categorize, or otherwise modify the highlights at a later time, either during or after the media event.

Users can also share media highlights. For example, a user can provide a gesture or other input to share the highlight by uploading the highlight to a social networking site, email the highlight to a friend as an attachment, send a direct URL to the highlight to a friend, send the highlight as a MMS or SMS message, and so forth. In one aspect, a centralized repository or a set of accessible distributed repositories can store highlights for multiple users. Then, when a user shares a highlight with family members, for example, the system can query the repository or repositories to determine whether any of the family members have already created a same, similar, or corresponding highlight. The system can share the highlight on behalf of the user only with those family members who have not yet created the highlight. The system can take a different action for those family members who have already highlighted that portion of the media event, such as sending them a message indicating that the user also highlighted or liked that section, and can indicate differences, if any, between their highlight and the highlight of the user, including metadata, comments, or other information describing the highlight.

Users can subscribe to the highlights. For example, a user can subscribe to particular types of highlights, highlights from particular sets of users (such as friends, acquaintances, or subject-matter experts), or highlights associated with a particular set of user activities. For example, a subscription can include highlights where more than a threshold quantity or percentage of highlighting users are taking notes, laughing, or taking notes. The subscription provides a way for users to discover content and interesting portions of content based on others' highlights. The system can provide notifications based on a subscription in real time while consuming the media content, via email, or via any other suitable notification communication modality.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, at a time and from a user watching a real-time media event, an indication to designate a highlight of the real-time media event, wherein the highlight is a portion of the real-time media event, the portion starting at a first temporal position in the real-time media event and ending at a second temporal position in the real-time media event;
defining the highlight by selecting the first temporal position and the second temporal position based on the time; and
associating, via a processor, the highlight with an individual profile of the user.

2. The method of claim 1, wherein the highlight comprises a parameter for one of media content or duration.

3. The method of claim 1, wherein defining the highlight is further based on the indication and an analysis of content of the real-time media event to identify the first temporal position and the second temporal position.

4. The method of claim 1, wherein generating the highlight is further based on the indication and an analysis of content of the real-time media event to identify one of an object, a topic, or a person in the real-time media event with which to associate the highlight.

5. The method of claim 1, further comprising:
receiving an additional indication from the user at a different time that is later than the time; and
selecting the first temporal position and the second temporal position further based on the different time.

6. The method of claim 1, wherein the highlight has a predetermined duration.

7. The method of claim 1, wherein the first indication further indicates a highlight category, the method further comprising:
associating the highlight with the highlight category.

8. The method of claim 1, wherein the indication is received via one of a remote control, a gesture received via a camera and processed by a gesture recognizer, or a speech command received via a microphone and processed by a speech recognizer.

9. The method of claim 1, wherein the highlight is associated with a specific temporal region of the real-time media event based on the first time.

10. A system comprising:
a processor;
a computer-readable storage medium storing instructions which, when executed by the processor, cause the processor to perform operations comprising:
retrieving a highlight database that stores a highlight associated with a recording of a media event, the highlight generated based on an input received from a user during a viewing of the media event, wherein the highlight comprises metadata, a first temporal position in the media event, and a second temporal position in the media event, and wherein the highlight is a portion of the media event between the first temporal position and the second temporal position;
starting a playback of the recording of the media event; and
during the playback and at the first temporal position, modifying the portion according to the metadata.

11. The system of claim 10, wherein starting the playback is based on a request from a viewer, and wherein the computer-readable storage device stores additional instructions which, when executed by the processor, cause the processor to perform a further operation comprising:
selecting the highlight from the highlight database based on a social network profile of the viewer.

12. The system of claim 11, wherein selecting the highlight is based on a threshold similarity level between the viewer and the user.

13. The system of claim 10, wherein modifying the portion comprises one of inserting an audio effect, inserting a video effect, modifying an audio portion of the recorded media event, modifying a video portion of the recorded media event, inserting a text element, pausing the recorded media event, presenting a poll, inserting a separate media object as a picture-in-picture, inserting a hyperlink, or inserting a document.

14. The system of claim 10, wherein the highlight database is stored in one of a separate location from the recorded media event, a network server, a local database, or in a same file as the recorded media event.

15. A computer-readable storage device storing instructions which, when executed by a processor, cause the processor to perform operations comprising:
displaying, at a device associated with a user, a list of highlights from a highlight database that stores highlights associated with a recording of a media event, the highlights generated based on an input received from a user during a viewing of the media event, wherein each highlight in the list of highlights comprises a first temporal position in the media event and a second temporal position in the recorded media event, and wherein the highlight is a portion of the media event between the first temporal position and the second temporal position;
receiving an instruction to modify a highlight selected by the user from the list of highlights; and
modifying the highlight according to the instruction.

16. The computer-readable storage device of claim 15, wherein modifying the highlight further comprises modifying metadata associated with the highlight.

17. The computer-readable storage device of claim 15, wherein modifying the highlight further comprises assigning the highlight to a category.

18. The computer-readable storage device of claim 15, storing additional instructions which, when executed by the processor, cause the processor to perform further operations comprising:
performing an analysis of the media event based on the instruction; and
modifying the highlight according to the analysis.

19. The computer-readable storage device of claim 15, wherein modifying the highlight further comprises assigning the highlight to a different media event.

20. The computer-readable storage device of claim 15, wherein the instruction is received via of a remote control, a gesture received via a camera and processed by a gesture recognizer, or a speech command received via a microphone and processed by a speech recognizer.

* * * * *